April 14, 1925.
V. M. FROGGE
1,533,589
ANIMAL TRAP
Filed Oct. 30, 1923    2 Sheets-Sheet 1
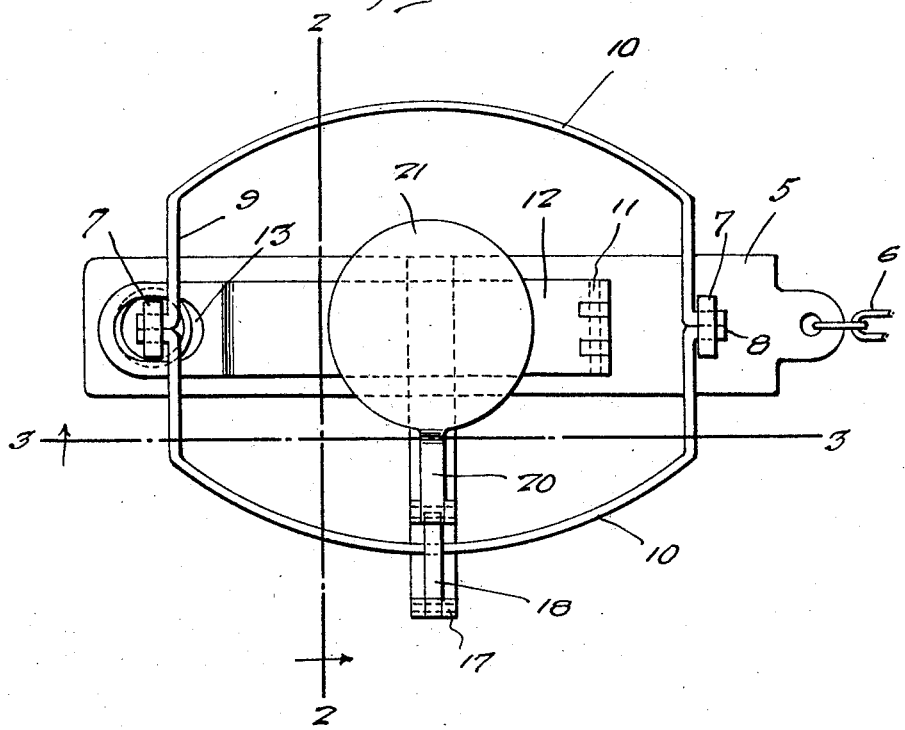
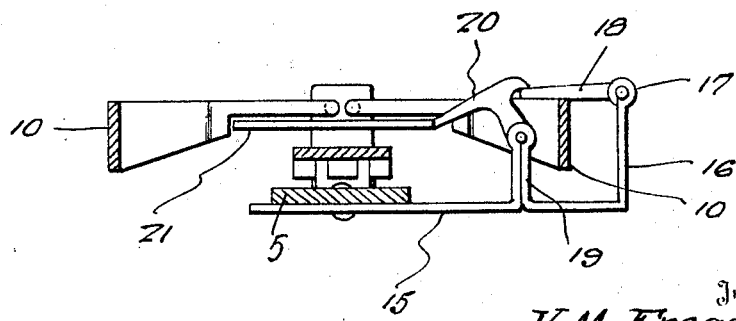

April 14, 1925.

V. M. FROGGE

ANIMAL TRAP

Filed Oct. 30, 1923

1,533,589

2 Sheets-Sheet 2

Witnesses:
P. M. Hunt.

Inventor
V. M. Frogge
By Clarence A. O'Brien
Attorney

Patented Apr. 14, 1925.

1,533,589

UNITED STATES PATENT OFFICE.

VIRGIL M. FROGGE, OF CENTRALIA, MISSOURI.

ANIMAL TRAP.

Application filed October 30, 1923. Serial No. 671,781.

*To all whom it may concern:*

Be it known that I, VIRGIL M. FROGGE, a citizen of the United States, residing at Centralia, in the county of Boone and State of Missouri, have invented certain new and useful Improvements in Animal Traps, of which the following is a specification.

This invention relates to an improvement in traps, and has more particular reference to an animal trap wherein the jaw members thereof are quickly and firmly swung to a closed position when the latch has been sprung and this without employing the usual dangerous and non-positive leaf spring.

The primary object of my invention is to provide an animal trap wherein the jaw members thereof are adapted to be swung to a closed position through the medium of one or more relatively strong expansible coiled springs, the construction of this trap being such as to permit the jaws to be easily swung to an open position and effectively maintained in such position until the latch mechanism has been actuated.

A still further object is to provide a device of the above character that may be manufactured and marketed at relatively small cost, the trap comprising but few parts and these co-related in such a manner as to reduce the possibility of disarrangement to a minimum.

With the above general objects in view and others that will appear as the nature of the invention is better understood, the same comprises the novel form, combination and arrangement of parts hereinafter more fully described, shown in the accompanying drawings and claimed.

Figure 3:
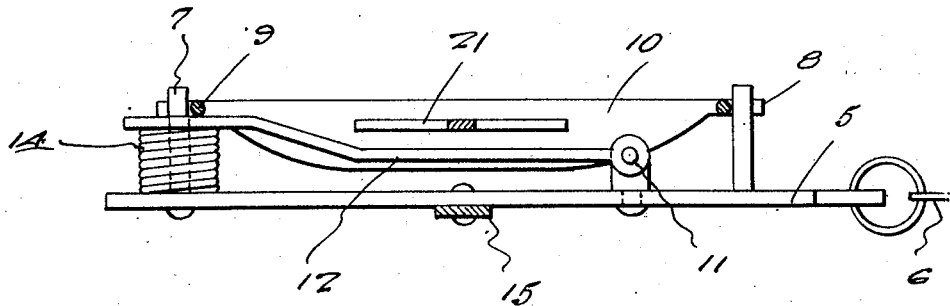
Figure 4:
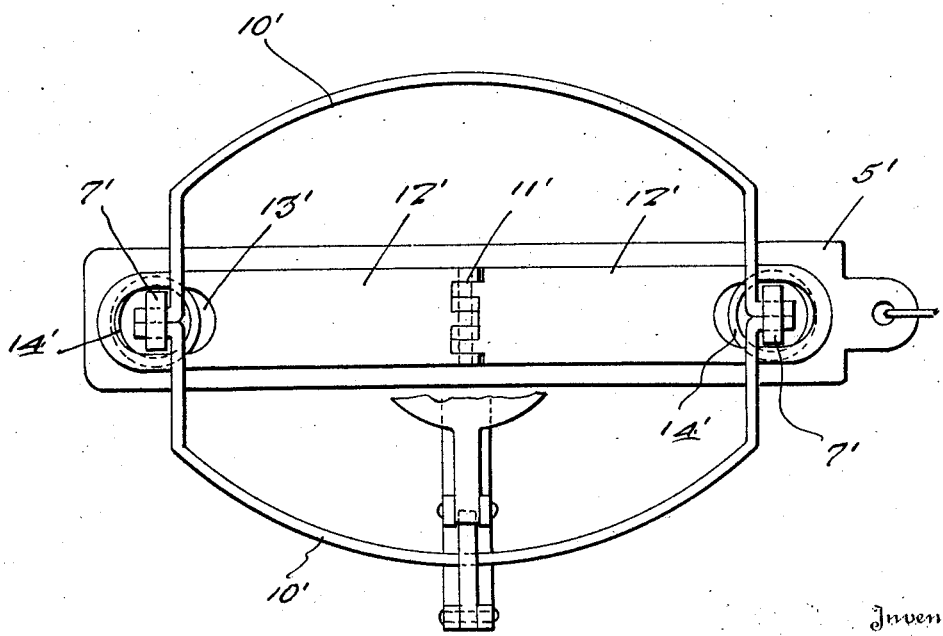

In the drawings wherein there is set forth the two most practical embodiments of the invention with which I am at the present time familiar, and wherein like reference characters indicate corresponding parts throughout Figures 1, 2 and 3, Figure 1 is a top plan view of a trap constructed in accordance with the present invention, the jaws thereof being shown in set position, Figures 2 and 3 are detailed transverse and longitudinal sectional views, respectively, taken upon the lines 2—2 and 3—3, respectively, of Figure 1, and Figure 4 is a top plan view of a slightly modified form of trap constructed in accordance with my invention, the trip plate thereof being fragmentarily shown.

First having reference to Figures 1, 2 and 3, wherein there is shown the main embodiment of my invention, 5 designates the trap base strip which is of a relatively elongated nature as shown and that is adapted to be secured at one end to one end of a chain section 6 the opposite end thereof being suitably anchored to the ground or the like.

This base strip 5 is provided adjacent its opposite ends with vertically arranged posts 7 the upper ends thereof being formed with openings through which extend and within which are rotatable the usual outturned pintles 8 upon the laterally directed ends 9 of the trap jaws 10 which may be and preferably are of conventional form.

Pivotally secured at 11 adjacent one end of the trap base plate 5 is a spring compresser and jaw opening plate 12 that extends parallel with said trap base plate 5 and is formed adjacent its opposite end with a relatively large somewhat oval shaped opening 13 for engagement over the adjacent vertical post 7 of the trap base plate 5, the side edges of this opening engaging the laterally directed ends 9 of said jaws 10 upon the upward swinging movement of said plate 12 for consequently effecting the closing thereof.

Surrounding said post 7 over which engages the swinging plate 12 is an extremely strong expansible helical spring 14 that must be compressed by the plate 12 upon its downward swinging movement for consequently allowing the jaws 10—10 to be opened, this spring obviously serving as a means for forcing said plate upwardly after the latch mechanism hereinafter described has been actuated for consequently swinging the jaws 10—10 to a closed position and maintaining the same in tight engagement with the leg or other portion of the body of the animal trapped.

Extending laterally from one side of the trap base plate 5 and secured to the bottom side thereof is a relatively narrow metal strip 15 that is bent upwardly at its outer end at 16 and formed at the extreme upper end thereof with spaced eyes 17 whereby a jaw locking pin 18 may be pivotally secured thereto. Intermediate the ends of this metal strip 15 the same is bent upwardly and then over upon itself for providing a vertical arm 19 to which is pivoted the usual dog member 20 of an animal controlled trip plate 21, it being obvious that this dog member 20 co-operates with the jaw locking pin 18 for maintaining the same in the position more clearly shown in Figure 1 whereby the jaws 10—10 are maintained in an open position against the action of the spring 14, a pressure upon said animal controlled latch plate 21 swinging said dog 20 upon its pivot thereby releasing the locking pin 18 and consequently permitting the jaws to quickly snap to a closed position under the action of said coiled spring. At this time I would direct attention to the fact, as seen in Figure 2, that the arm 20, forming the so-called dog is disposed at an angle with respect to the plate 21. Hence the latter is maintained in a horizontal position on a level below the jaw, when the trap is set for operation.

In the modified form of the invention shown in Figure 4, the elements are substantially similar to the elements of the trap set forth in Figures 1, 2 and 3, the only difference being that a pair of spring compresser and jaw opening plates 12' are provided, the inner ends thereof being pivotally secured to the trap base plate 5' and to each other as at 11'. In this instance, the outer free ends of said plates 12' are formed with relatively oval-shaped openings 13' for engagement over the vertical posts 7' of said trap base plate 5' whereby the relatively strong expansible coiled springs 14' that surround each of said posts 7' may be compressed, it being obvious that this structure provides a means for actuating the jaws 10'—10' to a closed position and this from the opposite ends thereof which will consequently overcome any liability of the animal moving his leg to one end of the jaws and freeing himself therefrom.

The detailed operation and construction of the two forms of the invention will be at once appreciated by those skilled in the art, it being obvious that I have provided a highly novel and simplified form of animal trap and one that will, I believe, meet with all of the requirements for a successful commercial use.

Minor changes may be made within the invention without departing from the spirit and scope of the appended claim.

Having thus described my invention, what I claim as new and desire to secure by Letters Patent is:—

An animal trap comprising a base plate provided on its top and on its opposite end with vertically disposed posts, a pair of animal gripping jaws pivotally connected at their ends to said posts, a jaw closing spring surrounding one of the posts, an elongated spring compressing and jaw closing plate pivoted at one end to the base plate and extending in alignment with the latter, said operating plate being provided at its free end with an opening surrounding the last named post and engaging said spring, a metal strip secured to the intermediate portion of the base plate and extending laterally therefrom, said strip being bent upon itself at spaced points to provide vertically disposed standards having eyes at their upper ends, an animal depressing plate provided with a latch pivoted in one of said eyes, a pin pivotally connected to the remaining eye and extending over the edge of one jaw to permit its free end to be engaged by said latch.

In testimony whereof I affix my signature.

VIRGIL M. FROGGE.